United States Patent
Kessler et al.

(10) Patent No.: US 9,020,777 B2
(45) Date of Patent: Apr. 28, 2015

(54) METHOD FOR LOCATING AND DETECTING THE POSITION OF THE WHEELS OF A VEHICLE

(75) Inventors: Sébastien Kessler, Toulouse (FR); Mohamed Cheikh, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 476 days.

(21) Appl. No.: 13/522,379

(22) PCT Filed: Jan. 18, 2011

(86) PCT No.: PCT/EP2011/000188
§ 371 (c)(1),
(2), (4) Date: Aug. 28, 2012

(87) PCT Pub. No.: WO2011/088985
PCT Pub. Date: Jul. 28, 2011

(65) Prior Publication Data
US 2012/0323529 A1    Dec. 20, 2012

(30) Foreign Application Priority Data

Jan. 21, 2010 (FR) .................................. 10 00226

(51) Int. Cl.
*G06F 17/18* (2006.01)
*B60C 23/04* (2006.01)
*G06F 11/00* (2006.01)

(52) U.S. Cl.
CPC ......... *B60C 23/0416* (2013.01); *B60C 23/0444* (2013.01)

(58) Field of Classification Search
CPC .................................................. G60C 23/0416
USPC ................................... 702/179–181, 188, 189
See application file for complete search history.

(56) References Cited

U.S. PATENT DOCUMENTS

| | | | |
|---|---|---|---|
| 6,385,511 B1 | 5/2002 | Fondeur et al. | |
| 2004/0069058 A1* | 4/2004 | Masudaya | 73/146 |
| 2008/0150710 A1 | 6/2008 | Mori et al. | |
| 2009/0002146 A1* | 1/2009 | Lin | 340/447 |

FOREIGN PATENT DOCUMENTS

| | | |
|---|---|---|
| CN | 101234584 A | 8/2008 |
| FR | 2 774 178 A1 | 7/1999 |
| FR | 2 819 336 A1 | 7/2002 |
| WO | 2007136701 A2 | 11/2007 |
| WO | 2009015265 A1 | 1/2009 |

OTHER PUBLICATIONS

English translation of the written opnion of the ISA of the corresponding PCT application.*
International Search Report, dated Mar. 4, 2011, from corresponding PCT application.

* cited by examiner

*Primary Examiner* — Phuong Huynh
(74) *Attorney, Agent, or Firm* — Young & Thompson

(57) ABSTRACT

A method for locating the position of the wheels of a vehicle, each wheel being equipped with a sensor capable of emitting a location signal and the vehicle being equipped with a receiver capable of receiving the location signals emitted by the sensors. The method includes the step of determining a signature of the location signal emitted by the sensor of each wheel as a function of the position of the wheel on the vehicle, and the step of storing in the receiver the signature and the corresponding position of each of the wheels. The receiver is equipped with at two least two antennas, called first and second antennas, the signature of the location signal emitted by the sensor of each wheel being determined from the strength difference between the strength of the signal received by the first antenna and the strength of the signal received by the second antenna.

11 Claims, 2 Drawing Sheets

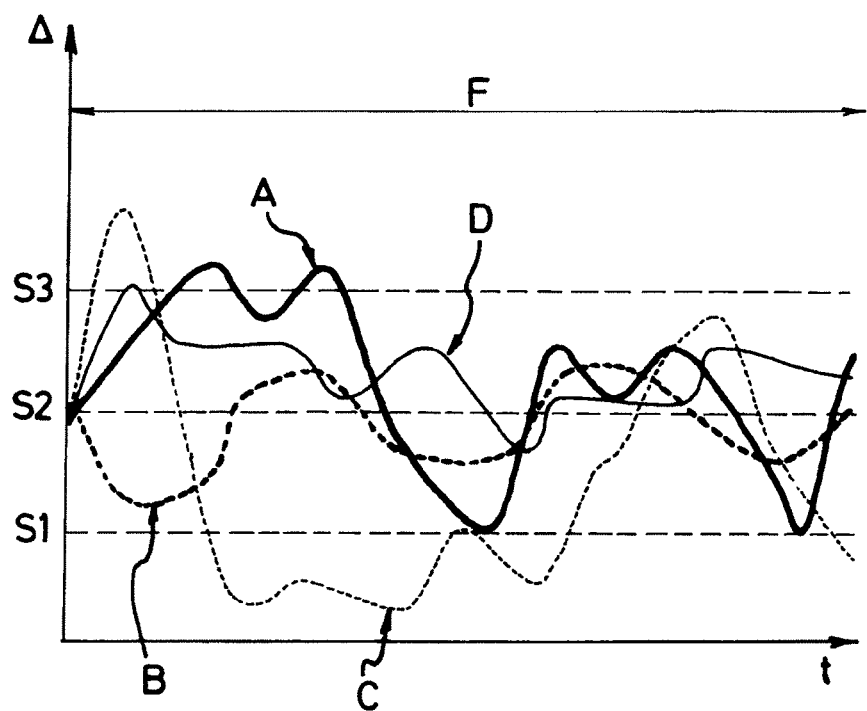

METHOD FOR LOCATING AND DETECTING THE POSITION OF THE WHEELS OF A VEHICLE

The present invention relates to a method for locating the position of the wheels of a vehicle and a method for detecting the position of a wheel on a vehicle.

Systems are known for permanently monitoring the pressure of the tires of a vehicle. In these systems, the tires are equipped with pressure sensors which transmit, by radio frequency pathway, the pressure measurements to a central processing unit positioned in the vehicle via a receiver mounted on the chassis of the vehicle. Such pressure information is processed by the central processing unit for display on the dashboard of the vehicle or for the emission of an alarm signal intended for the driver of the vehicle. When transmitting the pressure measurements, each sensor also transmits a code or identifier that enables it to be identified.

For such a system to work correctly, it is essential for the central processing unit to be able to determine the wheel to which the pressure information received corresponds.

For this, in some systems, the receiver is equipped with four receiving antennas, one for each wheel, positioned on the chassis of the car in proximity to each of the wheels. The antennas are linked to the receiver by electric cables. Each antenna is associated with a wheel position (front left, front right, rear left, rear right). The sensor of a wheel is then located by determining, for each antenna, the strongest signal picked up by that antenna, said signal corresponding to the signal emitted by the sensor of the wheel closest to that antenna. The main drawback with these systems is that they require, for each wheel, an antenna and a coaxial cable to link the antenna to the receiver, which represents both installation difficulties and a high system cost.

Also known are systems comprising a smaller number of antennas. The document FR 2 774 178 discloses a method for locating the position of the wheels on a vehicle. The wheels are each equipped with a sensor emitting a detection signal representative of the corresponding wheel. The vehicle itself is equipped with a detection signal processing unit. The processing unit is equipped with an antenna to receive the detection signal emitted by each antenna. The method described in this document consists in determining, for each wheel, a signature of a detection signal emitted by the sensor of that wheel and in then storing that signature and the corresponding position of the wheel on the vehicle in the processing unit. The recognition of the position (or location) of a wheel on the vehicle is obtained by analyzing the signature of a detection signal and by comparing this signature to the signatures stored in the processing unit.

In this method, the signal used to determine the signature is received by a single antenna. The intensity of the signal received by the antenna varies not only as a function of the position of the sensor which has emitted the signal but also as a function of numerous other criteria such as the temperature of the sensor, the battery level of the sensor, the emitted strength tolerances. These criteria may result in a strength variation of a number of decibels (of the order of 6 to 8 dB for example) on the signal received by the antenna and consequently induced errors in the recognition of the position of the wheels.

Furthermore, the comparison between the extracted signature and the stored signatures is relatively complex to implement since it entails determining the correlation between a signature extracted from a detection signal and stored signatures extracted from detection signals which were not necessarily emitted at the same angular position of the wheel.

One aim of the invention is to overcome all or some of the abovementioned drawbacks.

To this end, the subject of the present invention is a method for locating the position of the wheels of a vehicle, each wheel being equipped with a sensor capable of emitting a location signal and the vehicle being equipped with a receiver capable of receiving the location signals emitted by the sensors, said method comprising the step of determining a signature of the location signal emitted by the sensor of each wheel as a function of the position of said wheel on the vehicle, and the step of storing in said receiver said signature and the corresponding position of each wheel on the vehicle.

According to the invention, the receiver being equipped with at least two antennas, called first and second antennas, the signature of the location signal emitted by the sensor of each wheel is determined from the strength difference between the strength of the signal received by the first antenna and the strength of the signal received by the second antenna.

The signature is thus based on a differential strength measurement, which makes it possible to overcome in particular the abovementioned temperature, battery and tolerance effects.

According to a particular embodiment, said first and second antennas are antennas that have different electromagnetic properties, the first antenna having, for example, a horizontal polarization and the second antenna having a vertical polarization. According to another embodiment, it is also possible to use antennas that are distant from one another. More generally, use is made of antennas that make it possible to obtain a significant strength difference between the signals received by the two antennas.

According to a particular embodiment of the invention, the signature of the identification signal emitted by the sensor of a wheel is determined by the following steps:

measuring, at M measurement instants, the strength of the signal received by the first antenna and the strength of the signal received by the second antenna, determining, for each measurement instant, a value, called difference value, representative of the difference between the strength of the signal received by the first antenna and the strength of the signal received by the second antenna, and performing a statistical analysis of the M difference values relative to N predetermined threshold values, N being an integer greater than or equal to 1, so as to define, for each of the N threshold values, a so-called statistical value representative of the number of difference values that are greater than or equal to said threshold value or representative of the number of difference values that are less than or equal to said threshold value.

The statistical values associated with the N threshold values thus form a signature of the location signal emitted by the sensor of the wheel.

In practice, the strength of the signal received by an antenna is measured on the receiver by a strength indication device of RSSI (receiver signal strength indicator) type, which is known per se, or any other similar means.

According to a particular embodiment, the statistical analysis consists in determining, for each of the N threshold values, the percentage of difference values that are greater than or equal to said threshold value. The greater the number of threshold values N, the more accurate the signature of the signal emitted by the sensor. Similarly, the greater the number M of strength measurements received by the first and the second antennas, the more accurate the signature of the signal emitted by the sensor.

According to a particular embodiment, for a vehicle with four wheels equipped with sensors, the number N of threshold values is preferably at least equal to 3.

According to a particular embodiment, the location signal emitted by the sensor of a wheel comprises a plurality of frames, which may or may not be divided up into a number of bursts, and at least one difference value between the strength received by the first antenna and the strength received by the second antenna is determined during each of these frames.

Advantageously, the number of strength measurements per frame depends on the speed of the wheel and increases as the speed of the wheel increases.

This method for locating the position of the wheels is equivalent to a learning method on completion of which signatures and the corresponding wheel positions on the vehicle are stored in the receiver.

The invention also relates to a method for detecting the position of a wheel on a vehicle, each wheel of the vehicle being equipped with a sensor capable of emitting of a location signal and the vehicle being equipped with a receiver capable of receiving the location signals emitted by the sensors, a signature of the location signal from each sensor being determined previously and stored in said receiver, comprising a step of determining the signature of a location signal received by the receiver and the step of comparing said signature to the stored signatures so as to determine the position of the wheel corresponding to said received signal. According to the invention, the receiver being provided with at least two antennas, called first and second antennas, said signature is determined from the strength difference between the strength of the signal received by the first antenna and the strength of the signal received by the second antenna. The strength difference values are then listed relative to predetermined threshold values N.

The invention also relates to a location device for implementing the method for locating and detecting the position of the wheels of a vehicle as defined previously. The device comprises a receiver, at least first and second antennas, a switch with at least two input pathways insulated from one another and mounted in such a way that the receiver is connected to one or other of said first and second antennas, a computation unit for determining the signature and a control unit for controlling said switch and said computation unit.

The invention will be better understood, and other aims, details, features and advantages will become more clearly apparent from the following detailed explanatory description, with reference to the appended figures, in which:

FIG. 3 represents an example of curves illustrating the signatures based on a received strength difference between the first and the second antenna for each of the four wheels of a vehicle.

Figure 1:
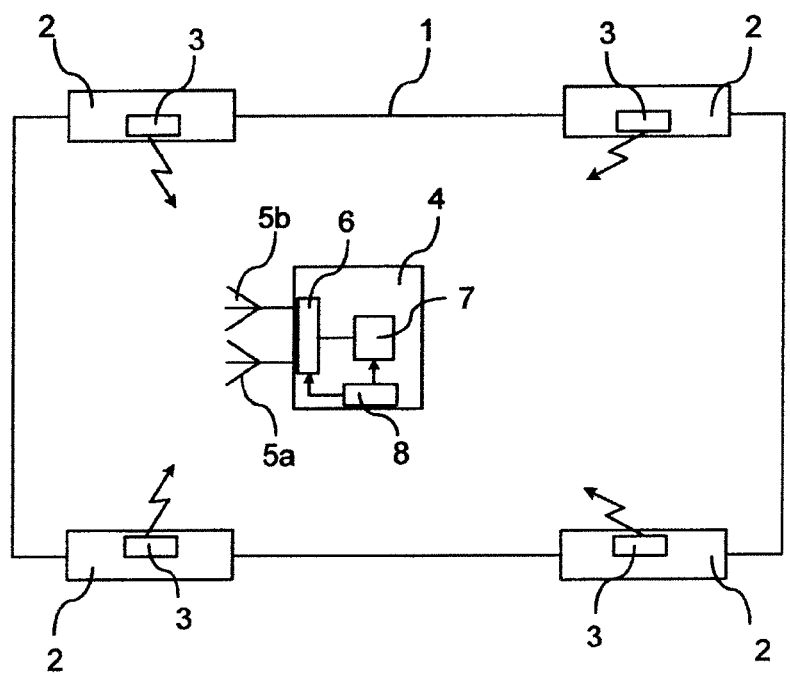
FIG. 1 represents a vehicle that enables the methods of the invention to be implemented.

The method of the invention is intended to be implemented on a vehicle as represented in FIG. 1. The vehicle 1 comprises wheels 2 each equipped with a sensor 3 capable of emitting signals to a receiver 4 positioned on the chassis of the vehicle. Each sensor 3 conventionally emits data representative of measurements performed by the sensor 3 on the wheel 2, for example pressure and/or temperature data for the wheel 2, and data, called identification data, enabling the sensor 3 to be identified.

According to one embodiment of the invention, the receiver 4 is equipped with at least two antennas, a first antenna 5a and a second antenna 5b, having different electromagnetic properties, for example different polarizations. The first antenna 5a is, for example, an antenna with horizontal polarization and the second antenna 5b is an antenna with vertical polarization. Since said antennas 5a, 5b have different electromagnetic properties, they can be located in the same place or remotely. These two antennas 5a, 5b are intended to receive the signals emitted by the sensors 3 of the wheels 2. Since these two antennas 5a, 5b have different electromagnetic properties, for one and the same emitted signal, the strength level of the signal received by the first antenna 5a is different from the strength level of the signal received by the second antenna 5b. For each antenna 5a, 5b, this strength difference varies as a function of the position on the vehicle 1 of the wheel 2 which emits the signal and also varies in time as the wheels 2 revolve.

According to the invention, it is proposed to use this variation of the received strength differences between the two antennas 5a, 5b to determine a signature for each of the wheels 2.

In order to locate the position of the wheels 2 on the vehicle 1, each sensor 3 of a wheel 2 emits a signal called location signal. This signal may be either a specific signal comprising specific frames for the location, or the usual signal comprising the identification data and the measurement data. This signal, whether specific or not, comprises at least the identification data of the sensor 3 so that the receiver 4 can identify the sensor 3 that sent the location signal. The strength measurements are performed during the reception of these frames by the receiver 4. Preferably, the location signal comprises only frames comprising identification data of the sensor 3 which makes it possible to send frames of very short duration. These frames are emitted in bursts and thus make it possible, for different angular positions of the wheel 2, to determine the strength of the signal received by each of the antennas 5a, 5b and obtain a statistical distribution of these strength measurements over a wheel 2 revolution.

Figure 2:
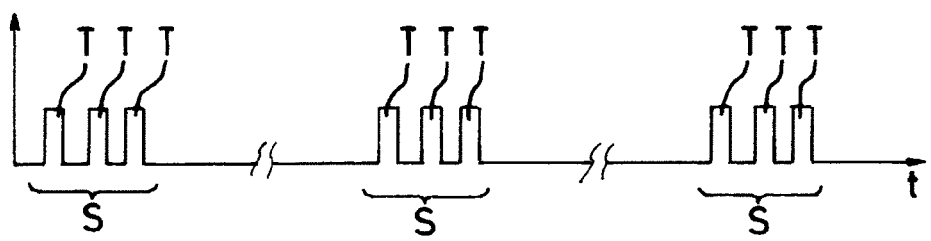
FIG. 2 represents a location signal emitted by the sensor of a wheel.

FIG. 2 represents an example of a location signal emitted per time unit t. It comprises frames T emitted in the form of periodic or quasi-periodic bursts S. In the example of FIG. 2, each burst S comprises three frames T. When the wheel revolves, the three frames T of the first burst S are emitted at different angular positions of the wheel 2. These frames are then received by each antenna 5a, 5b with different strength levels. The three frames of the next burst, which are emitted at angular positions which are a priori different from the first three frames, are received by each antenna 5a, 5b with yet other strength levels. For an emitted location signal, the strength levels received on each antenna 5a, 5b depend not only on the angular position of the wheel 2, but also on the position of the wheel 2 on the vehicle 1. It then becomes possible to define a specific signature for each wheel 2 from the strength difference received by the two antennas 5a, 5b.

According to the invention, it is therefore determined, for each wheel 2, a signature of the location signal emitted by the sensor 3 of that wheel 2 from the strength difference between the strength of the signal received by the first antenna 5a and the strength of the signal received by the second antenna 5b.

According to a particular embodiment, the signature of the identification signal emitted by the sensor 3 of wheel 2 is determined as follows:

a) at M measurement instants, the strength of the signal received by the first antenna 5a and the strength of the signal received by the second antenna 5b are measured, b) the strength of the signal received by the first antenna 5a and the strength of the signal received by the second antenna 5b are then determined, for each measurement instant, so as to obtain M difference values, and c) the M difference values are then statistically analyzed in relation to N predetermined threshold values, N being an integer greater than or equal to 1, so as to define, for each of the N threshold values, a so-called statistical value representative of the number of difference values that are greater than or equal to said threshold value or representative of the number of difference values that are less than or equal to said threshold value.

The result of the statistical analysis then forms the signature of the location signal emitted by the sensor 3 of wheel 2. A signature is thus determined for each of the sensors 3 of wheels 2 and stored in the receiver with the corresponding position of wheel 2 on the vehicle.

The measurements of strength of the signal received by each antenna 5a, 5b are performed during the reception of the frames T by the receiver 4. A number of measurements can be performed per frame. This number of measurements per frame depends on the speed of the vehicle 1. This is due to the fact that, when the vehicle 1 is stationary, there is no need to perform a large number of measurements per frame since they will all be identical. When the vehicle 1 is stationary, a single measurement per frame for example is therefore performed. However, when the vehicle 1 is running, it is necessary to perform a number of measurements per frame to obtain a fairly large number of strength measurements per wheel 2 revolution in order to be able to characterize the signature of the wheel 2.

Once the measurements have been performed for each of the antennas 5a, 5b, the difference between the strength of the signal received by the first antenna 5a and the strength of the signal received by the second antenna 5b is then determined for each measurement instant.

Curves are then obtained such as those illustrated in FIG. 3. Each curve, that is to say the curve A, B, C, D, is associated with a wheel 2 of the vehicle 1, respectively with the 1st, 2nd, 3rd and 4th wheel, and represents the temporal variation, per time unit t; of the strength difference Δ between the signal received by the first antenna 5a and the signal received by the second antenna 5b over a given measurement period F, for example here over a wheel 2 revolution. Each curve A, B, C, D is constructed from a large number of points representative of the strength difference values Δ in order for the results of the statistical analysis to be tracked to be sufficiently accurate and sufficiently different for each of the wheels 2. As an example, each curve A, B, C, D comprises at least the measurement results for around 20 bursts of at least 3 frames each.

A statistical analysis relative to predetermined thresholds is then performed on each of the curves. In the example illustrated in FIG. 3, the values of the points that make up each of the curves A, B, C, D are compared to three threshold values S1, S2 and S3, with S1<S2<S3. The analysis consists in counting, for each of the curves A, B, C, D, the number of difference values Δ greater than each of these thresholds. The results of this counting step for the curves A, B, C, D illustrated in FIG. 3 are presented in percentage form in the following table:

TABLE 1

| Thresholds | A | B | C | D |
|---|---|---|---|---|
| S1 | 100% | 100% | 55% | 100% |
| S2 | 75% | 50% | 35% | 90% |
| S3 | 10% | 0% | 10% | 0% |

The percentages contained in each column of Table 1 form the signature of the location signal for the corresponding wheel 2 and are stored in the receiver 4.

The number of thresholds necessary to the implementation of the method depends in particular on the number of wheels 4 of the vehicle 1. It is at least equal to 1 and is preferably equal to 3 in the case of a vehicle 1 with four wheels 2.

As indicated previously, the thresholds have different values. According to an advantageous embodiment, the thresholds are distributed regularly within the range of variation of the strength difference values received by the two antennas 5a and 5b. For example, if Dmax is the maximum strength difference value received by the two antennas 5a and 5b, then the threshold S1 is equal to $$\frac{D\max}{4},$$

the threshold S2 is equal to $$\frac{D\max}{2}$$

and the threshold S3 is equal to $$\frac{3 \cdot D\max}{4}.$$

This method for locating the wheels 2 on the vehicle 1, which is a learning method, is intended to correlate the signature of a location signal with the position on the vehicle 1 of the corresponding wheel 2. It can be implemented on each vehicle or for each type of vehicle in characterization phases. These characterization phases may be carried out, for example, during the development of the vehicle with the vehicle manufacturer. A single characterization per vehicle or per vehicle type is necessary.

The detection method itself is performed after the characterization phase and each time the vehicle is started up. This is in order to locate the wheels of the vehicle and in order to detect whether the driver has changed the position of the wheels for example.

To perform this subsequent detection of the position of a wheel 2 on the vehicle 1, the signature of the location signal emitted by the sensor 3 of this wheel 2 is determined from the strength levels received by the two antennas 5a and 5b and said signature is compared to the stored signatures. The signature of the location signal emitted by the sensor 3 of the wheel is determined as defined previously, namely by performing received strength measurements on each of the antennas 5a, 5b, by determining the difference between the strength of the signal received by the first antenna 5a and the strength of the signal received by the second antenna 5b and by performing a statistical analysis on these difference values.

The duration of the strength measurement period F of the location method (learning method) is generally longer than that of the detection method since the signature is formed from a large number of points in order to be statistically representative. The measurement period of the detection method however may be shorter because it may consist only of a plurality of measurement periods corresponding only to portions of the curves A, B, C, D of FIG. 3. It is in fact not necessary in the detection method to reconstruct the curves A, B, C, D of the learning method, if a smaller number of measurements taken randomly make it possible to reconstruct the signatures for each wheel 2.

The comparison step consists in comparing the determined signature with each of the stored signatures. Each of the statistical values of the determined signature is compared with the statistical values of the stored signature. A so-called latitude interval is advantageously defined around each statistical value of the stored signature, for example +/−5%, to cope with the shift due to a lesser number of strength measurements than that used during the location (learning) method. If the statistical value of the determined signature falls within the latitude interval of the corresponding statistical value of the stored signature, the statistical values are considered to coincide. If all the statistical values of the determined signature coincide with the statistical values of a stored signature, these two signatures are considered to be identical.

For the implementation of the method for locating and detecting the position of the wheels 2 on the vehicle, the strength measurements are performed instantaneously or quasi-instantaneously on the two antennas 5a and 5b. To this end, and with reference to FIG. 1, the receiver 4 comprises a switch 6 with two input pathways insulated from one another and mounted in such a way that the receiver 4 is connected to one or other of the antennas 5a and 5b, a computation unit 7 for making the measurements and determining the signatures and a control unit 8 for controlling the switch and the computation unit 7. When a strength measurement is performed on one of the antennas 5a, the control unit 8 controls the switch 6 to connect the other antenna 5b to the computation unit 7 so that the latter immediately thereafter performs a strength measurement on the other antenna 5b.

Obviously, the invention is not limited to the embodiment described and variant embodiments can be applied thereto without departing from the framework of the invention as defined in the claims.

In particular, instead of using antennas that have different polarizations, it is possible to use antennas that have different forms, with a first antenna in the form of a loop which is more sensitive to the magnetic field and another antenna in the form of a strand which is more sensitive to the electrical field.

Instead of using antennas that have different electromagnetic properties, it is also possible to use remote antennas, the distance between the two antennas preferably being a predetermined multiple of the wavelength of the location signals emitted by the sensors.

In particular, a receiver could be provided that has a larger number of antennas. The method described previously is then applied for all the possible pairs of antennas. It is also possible to provide a greater number of receivers, each receiver being connected to at least two antennas.

The invention claimed is:

1. A method for locating the position of the wheels (2) of a vehicle (1), each wheel (2) being equipped with a sensor (3) capable of emitting a location signal and the vehicle (1) being equipped with a receiver (4) capable of receiving the location signals emitted by the sensors (4), said method comprising the following steps:
    determining a signature of the location signal emitted by the sensor (4) of each wheel (2) as a function of the position of said wheel (2) on the vehicle (1), and
    storing in said receiver (4) said signature and the corresponding position of each of the wheels (2),
the receiver (4) being equipped with at least two antennas (5a, 5b), called first and second antennas (5a, 5b), the signature of the location signal emitted by the sensor (4) of each wheel (2) being determined from the strength difference between the strength of the signal received by the first antenna (5a) and the strength of the signal received by the second antenna (5b), said method being characterized in that the signature of the location signal emitted by the sensor (3) of a wheel (2) is determined by the following steps:
    measuring, at M measurement instants, the strength of the signal received by the first antenna (5a) and the strength of the signal received by the second antenna (5b),
    determining, for each measurement instant, a value, called difference value, representative of the difference between the strength of the signal received by the first antenna (5a) and the strength of the signal received by the second antenna (5b), and
    performing a statistical analysis of the M difference values relative to N predetermined threshold values, N being an integer greater than or equal to 1, so as to define, for each of the N threshold values, a so-called statistical value representative of the number of difference values that are greater than or equal to said threshold value or representative of the number of difference values that are less than or equal to said threshold value.

2. The method as claimed in claim 1, characterized in that the statistical analysis consists in determining, for each of the N threshold values, the percentage of difference values that are greater than or equal to said threshold value.

3. The method as claimed in claim 1, characterized in that, for a vehicle with 4 wheels, the number N of threshold values is at least equal to 3.

4. The method as claimed in claim 1, characterized in that the location signal emitted by the sensor (3) of a wheel (2) comprises a plurality of frames and in that at least one difference value is determined during each of the frames.

5. The method as claimed in claim 1, characterized in that said first (5a) and second (5b) antennas have different electromagnetic properties.

6. The method as claimed in claim 5, characterized in that said first (5a) and second (5b) antennas have different polarizations.

7. The method as claimed in claim 5, characterized in that said first (5a) and second (5b) antennas have different forms.

8. The method as claimed in claim 1, characterized in that said first (5a) and second (5b) antennas are remote antennas.

9. A method for detecting the position of a wheel (2) on a vehicle (1), each wheel (2) of the vehicle (1) being equipped with a sensor (3) capable of emitting a location signal and the vehicle (1) being equipped with a receiver (4) capable of receiving the location signals emitted by the sensors (3), a signature of the location signal from each sensor (3) being determined previously and stored in said receiver (4), comprising the following steps:
    determining the signature of a location signal received by the receiver (4),
    comparing said signature to the stored signatures so as to determine the position of the wheel (2) corresponding to said received signal,
the receiver (4) being provided with at least two antennas, called first (5a) and second (5b) antennas, said signature of the location signal being determined from the strength difference between the strength of the signal received by the first antenna (5a) and the strength of the signal received by the second antenna (5b), said detection method being characterized in that the signature of the location signal emitted by the sensor (3) of a wheel (2) is determined by the following steps:
    measuring, according to a less number of measurements than that used during the location method, the strength of the signal received by the first antenna (5*a*) and the strength of the signal received by the second antenna (5*b*), determining, for each measurement instant, a value, called difference value, representative of the difference between the strength of the signal received by the first antenna (5*a*) and the strength of the signal received by the second antenna (5*b*), and performing a statistical analysis of the M difference values relative to N predetermined threshold values, N being an integer greater than or equal to 1, so as to define, for each of the N threshold values, a so-called statistical value representative of the number of difference values that are greater than or equal to said threshold value or representative of the number of difference values that are less than or equal to said threshold value.

10. A location device for implementing the method as claimed in claim 1, characterized in that it comprises a receiver (4), at least first and second antennas (5*a*, 5*b*), a switch (6) with at least two input pathways insulated from one another and mounted in such a way that the receiver (4) is connected to one or other of said first and second antennas (5*a*, 5*b*), a computation unit (7) for determining the signature and a control unit (8) for controlling said switch (6) and said computation unit (7).

11. The method as claimed in claim 2, characterized in that, for a vehicle with 4 wheels, the number N of threshold values is at least equal to 3.

* * * * *